Figure 1:
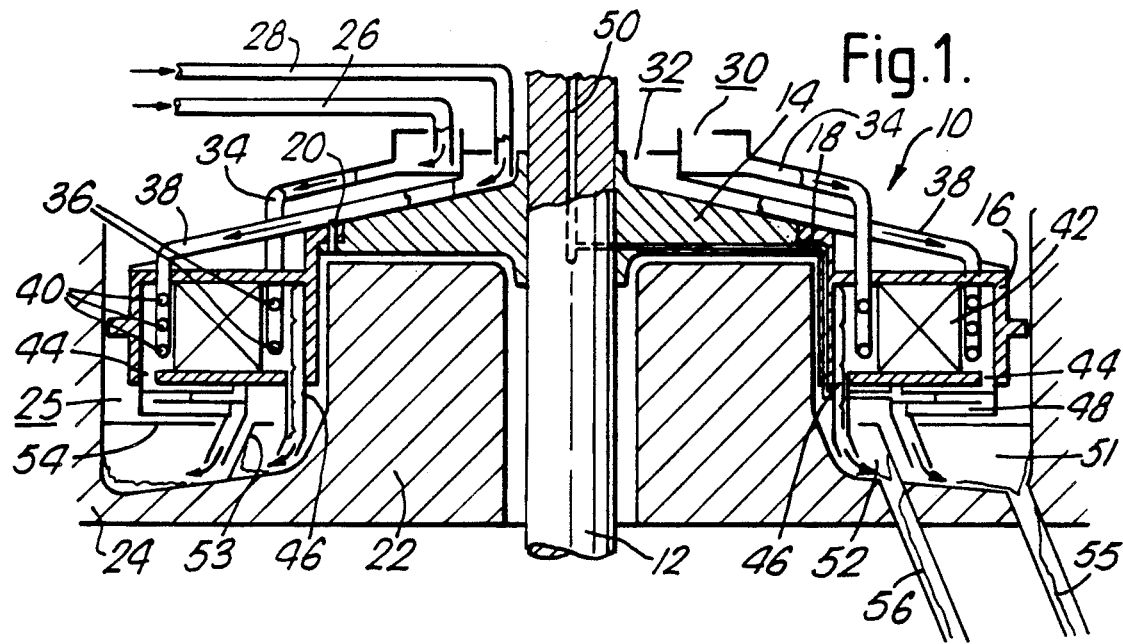

United States Patent [19]

Martin

[11] Patent Number: 5,084,249
[45] Date of Patent: Jan. 28, 1992

[54] ROTARY CENTRIFUGAL CONTACTOR

[75] Inventor: Peter D. Martin, Abingdon, United Kingdom

[73] Assignee: British Nuclear Fuels plc, Warrington, England

[21] Appl. No.: 346,401

[22] Filed: May 2, 1989

[30] Foreign Application Priority Data

May 11, 1988 [GB] United Kingdom ............... 8811195

[51] Int. Cl.⁵ .......................... B01D 11/04; B01J 8/08
[52] U.S. Cl. .................................. 422/258; 422/259; 422/209; 422/159
[58] Field of Search ............... 422/258, 259, 209, 159

[56] References Cited

U.S. PATENT DOCUMENTS 2,106,964  2/1938  Wells .
2,941,872  6/1960  Pilo et al. ........................ 422/259
3,728,082  4/1973  Mathieu et al. .
4,283,255  4/1981  Ramshaw et al. ............... 422/270

FOREIGN PATENT DOCUMENTS 0023745  11/1981  European Pat. Off. .
388966   3/1933   United Kingdom .
2024644  5/1979   United Kingdom .

Primary Examiner—Douglas W. Robinson
Assistant Examiner—Timothy J. Reardon
Attorney, Agent, or Firm—William R. Hinds

[57] ABSTRACT

A rotary contactor (10) suitable for liquid/liquid extraction processes in a nuclear fuel reprocessing plant includes a rotor (14) with a contacting chamber (16) defined within it, the chamber being of annular shape with its radial width considerably less than its inner radius. Neutron absorbing material (22) inhibits neutron transmission between different parts of the contactor. Where the rotation axis is upright, liquids may be fed into the contactor via open-topped annular feed channels (30, 32) at the upper surface of the rotor (14). The chamber (16) includes a packing material (42) such as wire mesh, random or structured packing. The contactor also includes an arrangement to control the radial position of the liquid/liquid coalescing interface, or to control the radial position at which one of the liquids is taken off, which may be operated by gas pressure.

15 Claims, 1 Drawing Sheet

ROTARY CENTRIFUGAL CONTACTOR

The invention relates to a rotary centrifugal contactor, for passing two liquids of different densities in countercurrent flow radially within a rapidly rotated cylindrical chamber.

Such contactors are known in the field of chemical engineering, one such design being the Podbielniak contactor made by Baker Perkins Inc. This comprises a rotor and shaft assembly turned about a horizontal axis; within the hollow rotor are a large number of concentric perforated plates. Two liquids of different densities are fed into the rotor through ducts within the shaft, which is provided with rotary seals, to flow in countercurrent through the rotor, being mixed as they pass through the perforated plates and being centrifugally separated in the annular spaces between the plates, and finally emerging through other ducts in the shaft. The centrifugal acceleration to which the liquids are subjected can be much greater than the earth's gravitational field strength, so such a contactor can achieve far greater liquid throughput than a gravity contactor of the same volume, and can achieve a separation performance equivalent to more stages of a mixer/settler ("theoretical stages") than can a gravity contactor of the same volume.

Known rotary contactors have hitherto not been thought suitable for use in the reprocessing of nuclear fuel, as several theoretical stages (say 6-10) must be achieved with adequate throughput yet in a criticality-safe geometry, but a conventional unit of criticality-safe diameter operating at a typical rotary speed would provide less than four theoretical stages. Furthermore the shaft seals on known designs do require occasional maintenance, and this is inconvenient where highly radioactive liquids have been treated.

According to the present invention, there is provided a rotary centrifugal contactor for treating two liquids of different densities comprising a rotor rotatable about an axis, with at least one contacting chamber defined within the rotor, said chamber being of annular or part-annular shape centered around the rotation axis and of inner radius greater than 0.2 m and with a ratio of inner radius to radial width greater than 1.0, and gas pressure means to adjust the radial position, during operation, of the liquid/liquid coalescing interface.

Also according to the invention, there is provided a rotary centrifugal contactor for treating two liquids of different densities comprising a rotor rotatable about an axis, with at least one contacting chamber defined within the rotor, said chamber being of annular or part-annular shape centered around the rotation axis and of inner radius greater than 0.2 m and with a ratio of inner radius to radial width greater than 1.0, the contactor also comprising a neutron-absorbing material arranged so as to inhibit neutron transmission between different parts of the contactor, and gas pressure means to adjust the radial position, during operation, of the liquid/liquid coalescing interface.

Preferably the said ratio exceeds 1.5, and desirably it exceeds 2.0. Thus the contacting chamber is in the form of at least part of an annulus of large diameter and comparatively small cross-section. Such a contacting chamber of annular form therefore approximates, from the point of view of criticality, to an isolated infinitely long cylinder of safe cross-section. For example the inner diameter might be about 1.0 m, and the chamber be of square cross-section with sides 0.15–0.20 m, which ensures it will be criticality-safe for the concentrations of fissionable material and of nitric acid commonly encountered in reprocessing practice. At such a diameter and at a speed in the range 2000 to 5000 r.p.m (revolutions per minute) the radial thickness of a theoretical stage would be small enough (of the order of 10 mm) that a large enough number of stages can be provided across the radial width of the chamber.

In the preferred embodiment the rotation axis is arranged vertically, and the liquids are fed into the contacting chamber via open-topped annular feed channels defined at the upper surface of the rotor; similarly the liquids emerge from the chamber into open-topped stationary annular collecting channels which may be provided below the rotor. This avoids any need for rubbing rotary seals, to be exposed to either of the liquids, so reducing the problems of maintenance.

The gas pressure means comprises means to control the radial position of the liquid/liquid coalescing interface, or to control the radial position at which one of the liquids is taken off, which may be operated by gas pressure.

It should be understood that a plurality of such rotors may be driven on a common shaft, and be used to perform successive treatments of one of the liquids. The contacting chamber might contain a plurality of radially spaced perforated plates, or might contain a packing of wire mesh or one of a number of proprietary random or structured packing materials, to ensure effective interfacial contact of the two liquids.

Figure 2:
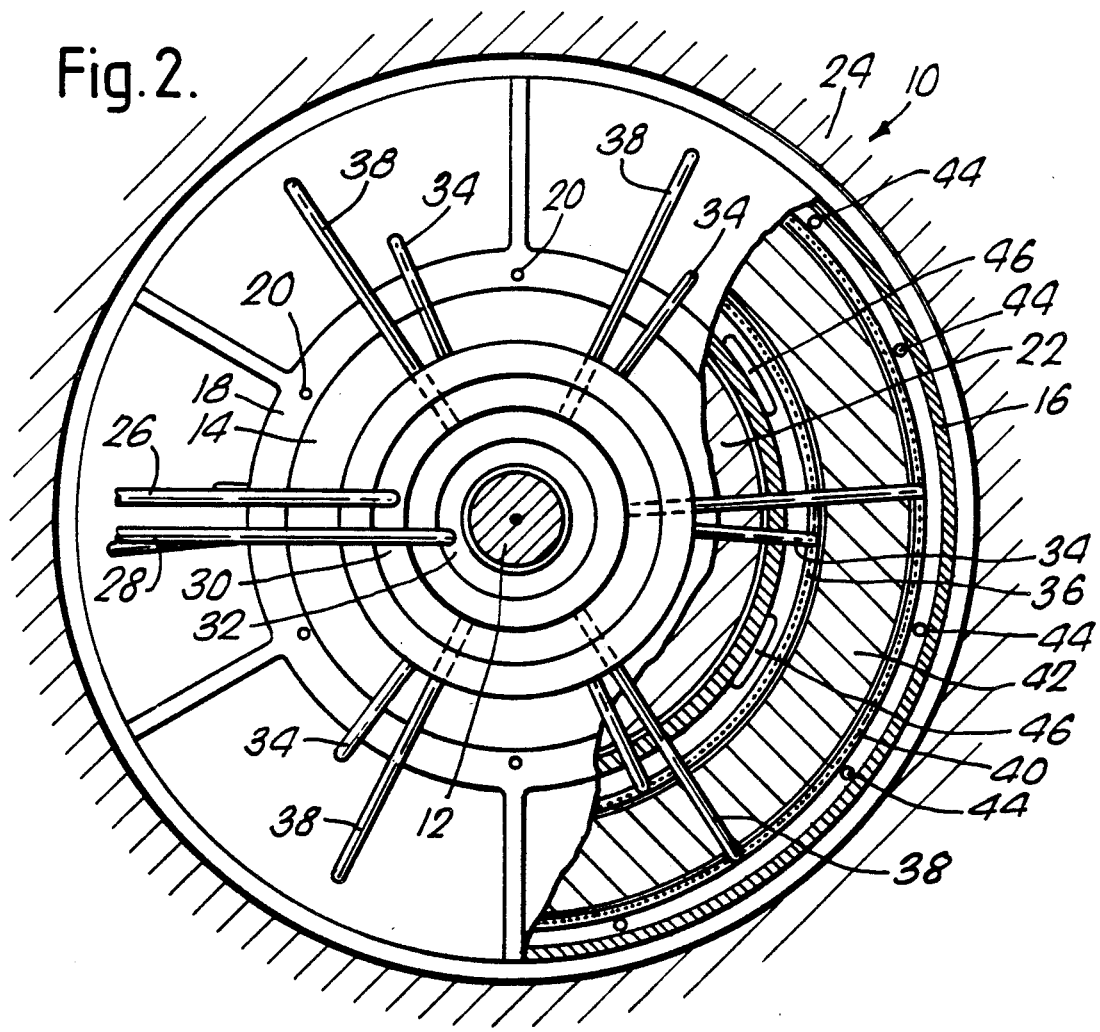

The invention will now be further and more particularly described, by way of example only, and with reference to the accompanying drawings, in which:

FIG. 1 shows a sectional view in a vertical plane through a rotary centrifugal contactor; and FIG. 2 shows a plan view of the contactor of FIG. 1, partly broken away.

Referring to FIGS. 1 and 2 there is shown a rotary centrifugal contactor 10 for mixing and separating two liquids to bring about transfer of particular species between the liquids, for use in a nuclear fuel reprocessing plant. The liquids might be an aqueous nitric acid solution of fissionable materials and fission products, and tributylphosphate in odorless kerosene, the latter being of lower density. The contactor 10 includes an upright shaft 12 to which is fixed a titanium rotor disc 14 of diameter 0.6 m. Around this is fixed an annular hollow stainless steel chamber 16 of rectangular cross-section 0.2 m wide and 0.12 m high, which is below the level of the disc 14; an upstanding L-cross-section flange 18 around the inner perimeter of the chamber 16 rests on the outer perimeter of the disc 14 and is attached to it by pins 20. Between the chamber 16 and the shaft 12 is a static core 22 of neutron absorbing material, and this material extends as shielding 24 radially outwards below the chamber 16, and upwards outside the chamber 16, so that the chamber 16 is in an annular trough 25 defined by the core 22 and the shielding 24.

Above the contactor 10 are two static feed pipes 26 and 28 for the two liquids (referred to as the heavy phase and the light phase), which discharge into two open-topped concentric annular feed channels 30 and 32 fixed on the upper surface of the rotor disc 14. The heavy phase feed channel 30 communicates with the chamber 16 via six radial tubes 34 joined to two perforated distributor-ring tubes 36 within the chamber 16 near its radially innermost wall. Similarly the light phase feed channel 32 communicates with the chamber 16 via six radial tubes 38 joined to three perforated distributor-ring tubes 40 within the chamber 16 near its outermost wall. Between the distributor-ring tubes 36 and the distributor-ring tubes 40 the chamber 16 is filled with packing material 42 (shown symbolically in the Figures) to ensure efficient interfacial contacting of the phases. Apertures 44 and 46 are provided in the floor of the chamber 16 through which the liquids can emerge after contacting each other, immediately adjacent to the outermost and innermost walls of the chamber respectively, the heavy phase outlet apertures 44 incorporating an air-pressure controlled offtake double weir 48. A duct 50 extending through the inner wall 16, the disc 14 and the shaft 12 enables pressurized air or other gas to be supplied to the double weir 48. The lower part of the annular trough 25 is divided into two annular open-topped effluent channels 51 and 52 by baffles 53, 54, and respective offtake ducts 55, 56 communicate with these channels 51 and 52. Liquid emerging through the aperture 44 or 46 falls into the respective channel 51 or 52.

In operation of the contactor 10 the shaft 12 and so the rotor disc 14 and the chamber 16 are rotated at a rotational speed typically between 2000 and 5000 rpm. Heavy phase liquid is supplied to feed channel 30 via pipe 26, and light phase liquid to feed channel 32 via pipe 28, so the heavy liquid enters the chamber 16 through the distributor-ring tubes 36 and the light liquid enters through the distributor-ring tubes 40. Because of the rapid rotation, the liquids are subjected to a centrifugal force field considerably greater than gravity, and due to density differences the heavy phase liquid flows radially outward and the light phase liquid radially inward through the packing material 42 in the chamber 16, the flows thus being in counter-current. The two phases separate out in the regions between the tubes 40 and the outer wall of the chamber 16, and between the tubes 36 and the inner wall of the chamber respectively so that separated phases emerge from the apertures 44 and 46 to fall into the effluent channels 51 and 52 and to flow out of the offtake ducts 55 and 56. The static pressure at the outer wall of the chamber 16 is equal to the pressure head due to the heavy phase liquid in the uppermost section of the double weir 48 (which is always full, during operation) plus the pressure of the gas in the duct 50; this gas pressure exceeds atmospheric by the pressure head due to the difference in liquid levels between the middle and the lowermost portions of the double weir 48. Adjustment of the gas pressure enables the radial position of the inner coalescing interface in the chamber 16 to be varied.

It will be appreciated that a rotary contactor might differ in some respects from that described above. For example instead of a single annular chamber 16 the annular chamber 16 might be divided into a plurality of sectors by radially extending walls; indeed a plurality of separate contacting chambers might be installed around a rotor, or a rotor might incorporate just one such contacting chamber. A variety of different packing materials might be used within the chamber 16 to ensure intimate mixing of the two liquids, for example the packing 42 might be a random packing such as Raschig rings or modern proprietary variants, structural or perforated plate packing, or wire mesh. Although the upper and lower surfaces of the chamber 16 which engage the packing material 42 are shown as being smooth, they may alternatively be provided with concentric ridges or fins to minimize fluid flow next to these surfaces. In order that the aerodynamic resistance to movement of the rotor, and hence its power requirement, should be minimized, the radial feed tubes 34 and 38 can be covered by a fairing or incorporated within a smoothly streamlined rotor. Aerodynamic resistance can be further reduced by a reduction in the local gas density, for instance by operating the contactor in an atmosphere consisting substantially of helium.

I claim:

1. A rotary centrifugal contactor for treating two liquids of different densities comprising a rotor rotatable about an axis, with at least one contacting chamber defined within the rotor, said chamber being of annular or part-annular shape centered around the rotation axis and of inner radius greater than 0.2 m and with a ratio of inner radius to radial width greater than 1.0, and gas pressure means to adjust the radial position, during operation, of the liquid/liquid coalescing interface.

2. A contactor as claimed in claim 1 wherein the said ratio exceeds 1.5.

3. A contactor as claimed in claim 2 wherein the said ratio exceeds 2.0.

4. A contactor as claimed in claim 3 with an inner diameter of the chamber about 1.0 m, the chamber being of square cross-section with sides of length between 0.15 and 0.20 m.

5. A contactor as claimed in claim 1 wherein the rotation axis is arranged vertically, and the contactor includes two annular feed channels defined on the rotor, and ducts providing fluid communication between the feed channels and the chamber, the bottom surfaces of the feed channels both being higher than the bottom of the annular chamber, and each feed channel having an annular opening above its bottom surface whereby a liquid may be fed into the channel from a stationary supply means during rotation of the rotor.

6. A rotary centrifugal contactor for treating two liquids of different densities comprising a rotor rotatable about an axis, with at least one contacting chamber defined within the rotor, said chamber being of annular or part-annular shape centered around the rotation axis and of inner radius greater than 0.2 m and with a ratio of inner radius to radial width greater than 1.0, the contactor also comprising a neutron-absorbing material arranged so as to inhibit neutron transmission between different parts of the contactor, and gas pressure means to adjust the radial position, during operation, of the liquid/liquid coalescing interface.

7. A contactor as claimed in claim 6 wherein the rotation axis is arranged vertically, and the contactor includes two annular feed channels defined on the rotor, and ducts providing fluid communication between the feed channels and the chamber, the bottom surfaces of the feed channels both being higher than the bottom of the annular chamber, and each feed channel having an annular opening above its bottom surface whereby a liquid may be fed into the channel from a stationary supply means during rotation of the rotor.

8. A contactor as claimed in claim 1 wherein said chamber is a single chamber.

9. A contactor as claimed in claim 1 wherein said chamber is undivided over its circumferential extent.

10. A contactor as claimed in claim 1 wherein said chamber has radially extending end surfaces which are smooth.

11. A contactor as claimed in claim 1 wherein said chamber has radially extending end surfaces which are configured with fins or ridges to minimize fluid flow next to these surfaces.

12. A contactor as claimed in claim 6 wherein said chamber is a single chamber.

13. A contactor as claimed in claim 6 wherein said chamber is undivided over its circumferential extent.

14. A contactor as claimed in claim 6 wherein said chamber has radially extending end surfaces which are smooth.

15. A contactor as claimed in claim 6 wherein said chamber has radially extending end surfaces which are configured with fins or ridges to minimize fluid flow next to these surfaces.

* * * * *